June 21, 1966  S. F. DI GIACOMO ETAL  3,256,738
MAGNETOSTRICTIVE TRANSDUCER
Filed May 23, 1963  2 Sheets-Sheet 1
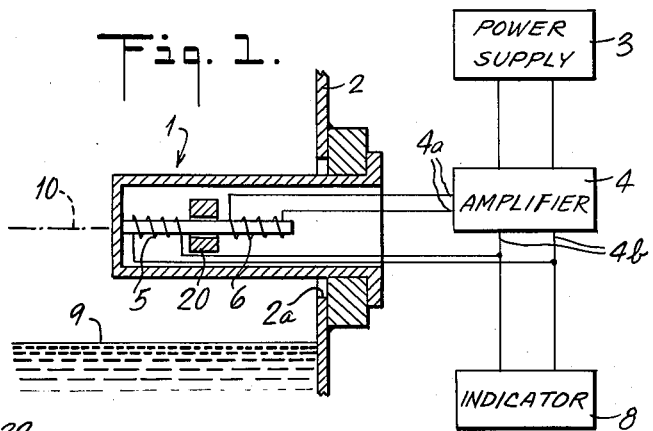
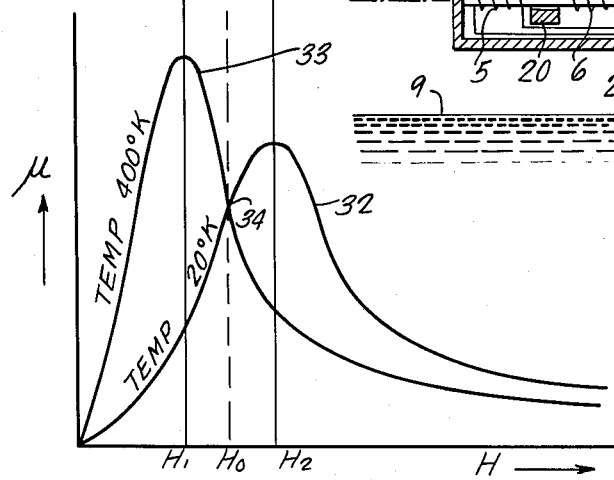
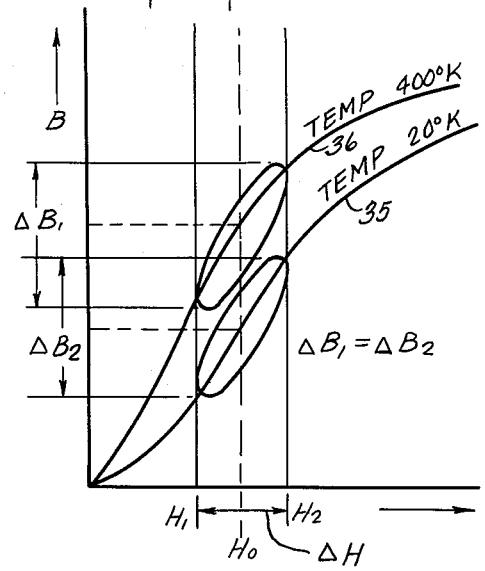
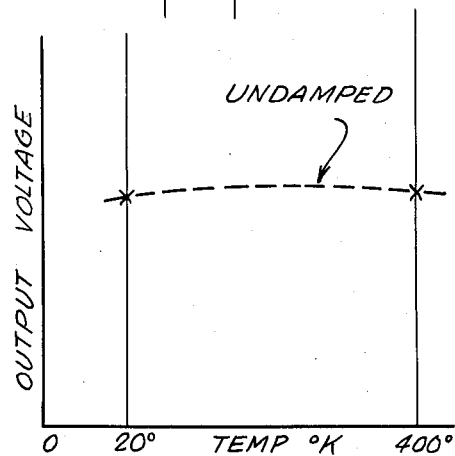
INVENTORS
SEBASTIAN F. DI GIACOMO
WALTER C. LEWIS
BY JAMES D. REID
Lester N. Clark
ATTORNEY

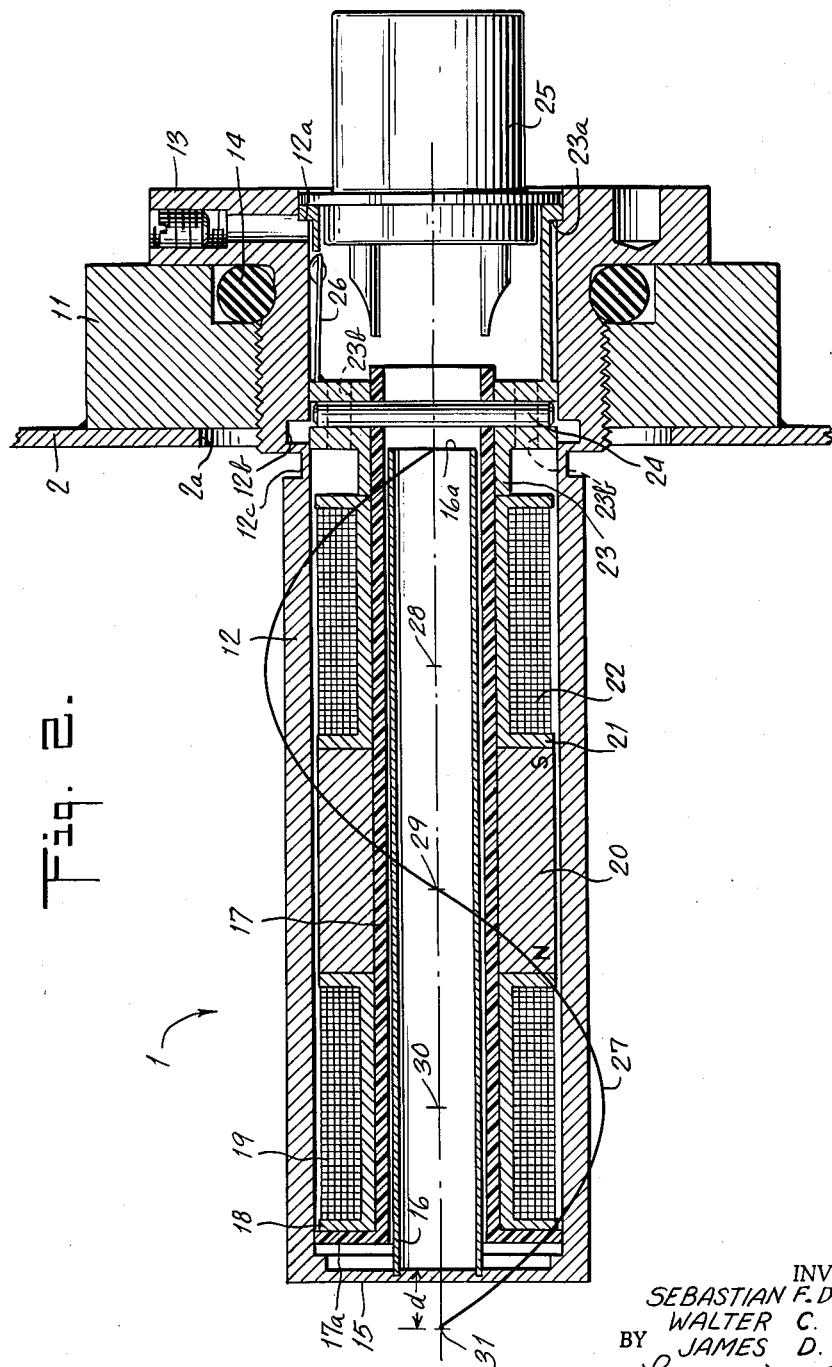

United States Patent Office 3,256,738
Patented June 21, 1966

3,256,738
MAGNETOSTRICTIVE TRANSDUCER
Sebastian F. Di Giacomo, Merrick, Walter C. Lewis, Woodside, and James D. Reid, Whitestone, N.Y., assignors to Simmonds Precision Products Inc., New York, N.Y., a corporation of New York
Filed May 23, 1963, Ser. No. 282,611
7 Claims. (Cl. 73—290)

This invention relates to magnetostrictive transducers, and particularly to transducers adapted for use as liquid level sensors. While certain features of the invention are of particular utility in connection with liquid level sensors, other features are of more general utility in connection with magnetostrictive transducers for other purposes.

It has been proposed to determine the presence or absence of liquid at a particular level by exposing at that level a diaphragm or other vibratable structure driven by a magnetostrictive transducer at a frequency in the sonic or ultrasonic range. When the diaphragm is damped by the presence of liquid on one of its surfaces, it vibrates with a predetermined amplitude. When there is no liquid on the diaphragm, it vibrates at a somewhat greater amplitude. The difference between these two amplitudes of vibration may be readily measured and used as an indication of the presence or absence of liquid at the level of the diaphragm.

When a liquid level measuring device is used on an aircraft, a spacecraft, or the like, it is required to operate accurately over a very wide range of temperatures. In the case of a spacecraft, operation in the cryogenic temperature range may be required. For example, a typical temperature range requirement is from 20° K. to 400° K.

The response characteristics of magnetostrictive materials are known to vary with temperature. Where the temperature range is as wide as the example just given, the variation in output of a magnetostrictive transducer due to temperature changes of the order indicated may be of nearly the same magnitude as the variation in output due to the presence or absence of liquid. It is therefore desirable to construct a magnetostrictive transducer whose output/input ratio is substantially unaffected by temperature variations within a predetermined range.

In any liquid level measuring device of the type described, it is also desirable that the transducer have a high dynamic ratio. In other words, the ratio between its undamped and damped output signals should be as great as possible.

It is also desirable that a magnetostrictive transducer of the type described be operable when mounted in any attitude. That is to say, the transducer should be capable of accurate operation whether mounted vertically, horizontally, or diagonally. Furthermore, it should operate accurately with either end up or down.

An object of the present invention is to provide a magnetostrictive transducer which is operable over a temperature range of substantial width without substantial variation in the output of the transducer due to temperature changes.

Another object of the invention is to provide a transducer of the type described having maximum sensitivity (output/input ratio) throughout its range of operating temperatures.

Another object of the invention is to provide a magnetostrictive transducer useful as a liquid level sensor and substantially unaffected by the attitude of the transducer.

Another object is to provide a device of the type described which is compact and easy to manufacture.

Other objects and advantages of the invention will become apparent from a consideration of the following specification and claims, taken together with the accompanying drawings.

In the drawings:
FIG. 1 is a diagrammatic illustration of a liquid level sensing system employing a transducer constructed in accordance with the invention;
FIG. 2 is a cross-sectional view, on an enlarged scale, showing a magnetostrictive transducer embodying the invention;
FIG. 3 is a graphical representation of permeability-magnetizing force characteristics of the magnetostrictive element in the transducer of FIG. 2, at the temperatures at the ends of its operating range;
FIG. 4 is a graphical illustration of the variations of flux density (B) with magnetizing force (H) at the same two temperatures; and
FIG. 5 is a graphical illustration of the variation of the undamped output of the transducer of FIG. 2 with variations in temperature.

Referring now to FIG. 1, there is shown a transducer generally indicated at 1 and mounted on the wall of a tank 2 so that the transducer projects inwardly of the tank. The transducer is shown only diagrammatically in this figure and is shown in greater detail in FIG. 2.

A power supply 3 supplies electrical power to an oscillator and amplifier circuit 4 having input terminals 4a and output terminals 4b. The output terminals 4b are connected to a driving coil 5 in the transducer 1, which also includes a pickup coil 6 connected to the input terminals 4a. The transducer 1 thus forms part of the feedback path of the circuit 4, and the frequency of oscillation of that circuit is determined by the resonant frequency of the transducer 1. The output terminals 4b are also connected to an indicator 8, which may be any suitable mechanism and/or circuitry for operating a signal, an oscilloscope, a recorder, or any equivalent indicating mechanism.

When the liquid in the tank 2 is at the level 9, below the transducer 1, the transducer 1 vibrates at a relatively high amplitude. An alternating signal of corresponding amplitude is induced in the coil 6. That signal is amplified by the amplifier 4 and actuates the indicator 8, which may be a lamp signal or an oscilloscope, for example. Any other suitable indicator may be employed. When the liquid level rises to the level indicated at 10 in the drawing, the vibrations of the diaphragm at the inner end of the transducer 1 are damped, so that the amplitude of the signal induced in the coil 6 is reduced and the output of the amplifier 4 is correspondingly reduced, thereby producing a corresponding change in the indicator 8.

FIG. 2

The tank 2 is provided with an aperture 2a in its relatively thin wall adjacent the level where the presence or absence of liquid is to be determined. An annular boss 11 is welded to the wall 2 of the tank and encircles the aperture 2a. The boss 11 is internally threaded to receive an external thread formed on a housing 12 of the transducer 1. The housing 12 is provided at its right hand end, as seen in the drawing with a flame 13 which abuts the outer face of the boss 11. A rubber O-ring 14 is squeezed between the flange 13 and the boss 11 to seal the threaded joint between the housing 12 and the boss 11 against leakage. A suitable groove is provided in the pheriphery of the housing 12 to receive the O-ring 14.

The housing 12 is hollow and cylindrical and is closed at its inner (or left hand) end by an integral diaphragm 15. A tube 16 of magnetostrictive material is suitably fastened as by welding to the center of the diaphragm 15. The tube 16 is supported only by the diaphragm 15 and extends therefrom inwardly of the housing 12 to a free end shown at 16a.

A sleeve 17 of electrically insulating material, preferably of a material having favorable characteristics with regard to lack of brittleness at low temperatures, such as Teflon, is provided with a flange 17a at its inner end. The periphery of the flange 17a abuts against the inner surface of the housing 12 near the closed end thereof but at a locality spaced from that closed end. A spool 18 carries a coil 19 which constitutes the drive winding of the transducer. The spool 18 encircles the sleeve 17 and abuts against the flange 17a. A permanent magnet 20 of annular form and magnetized longitudinally as indicated by the legend in the drawing (but not necessarily with the polarity indicated), encircles the sleeve 17 just to the right of the spool 18 as it appears in the drawing. Another spool 21 encircles the sleeve 17 to the right of the magnet 20, and carries a coil 22, which serves as the pickup winding of the transducer.

A collar 23 of non-magnetic metal, for example brass, extends inwardly of the housing 12 from the right hand end thereof and is provided with an external shoulder 23a which abuts against an internal shoulder 12a formed in the housing 12. The inner end of the collar 23 encircles the sleeve 17. The collar 23 and the sleeve 17 are connected by a pin 24 extending transversely through aligned holes in the collar and sleeve. The right hand end of collar 23 is closed by and attached to an electrical connector 25 of conventional construction. The connecting wires for the coils 19 and 22 extend through passages 23b formed in the collar 23 and thence through the electrical connector 25. The collar 23 is provided with a spring finger 26 having a contact at its right hand end, whose function is to establish a good ground connection between the collar and the housing 12.

The housing 12 is provided with an internal groove 12b, which in the construction shown, is near the inner end of the collar 23. The housing 12 is also provided with an external groove 12c just to the left of the internal groove 12b. The two grooves are separated by a thin wall. The two grooves and the connecting portions of the housing 12 associated with the grooves constitute a longitudinally flexible convolution in the housing 12. This convolution permits those portions of the housing 12 to the left of the groove 12c to vibrate freely without substantial transmission of the vibration to the right hand end of he housing 12 and hence to the mounting boss 11. While this convolution is illustrated as being near the mounted end of the housing 12, it could alternatively be located anywhere along the cylindrical wall of the housing 12.

When a magnetostrictive element such as tube 16 is placed in a magnetic field, it either expands or contacts longitudinally, depending up on the magnetrostrictive characteristics of the particular material of which the element is made. The sense of the magnetostrictive response, i.e., expansion or contraction, is the same regardless of the polarity of the magnetic field. If the field alternates, the magnetostrictive element goes through a complete cycle of expansion and contraction (or vice versa) during each half cycle of the applied magnetic field, so that the magnetostrictive response is at a frequency which is twice the frequency of the applied magnetic field. However, if the applied magnetic field is fluctuating rather than alternating, and maintains the same polarity at all times, then the magnetostrictive response is at the same frequency as the applied field.

In the structure shown, the permanent magnet 20 supplies a unidirectional field more intense than the alternating field supplied by the driving coil 5, so that the resultant field is unidirectional, but fluctuating in intensity. Consequently, the magnetostrictive response of the element 16 is at the same frequency as the current in the drive winding 5. Since that frequency is the same as the natural frequency of oscillation of the vibrating unit including the tube 16, the diaphragm 15, and that portion of the housing 12 to the left of the groove 12c, then a standing wave is set up in the magnetostrictive tube 16. The amplitude of the velocity along the tube 16 is illustrated by the curve 27 in FIG. 2. The points (28, 30) of zero stress or maximum motion of the tube are known and identified herein by the term "node of stress." The points (16a, 29) of maximum stress and minimum motion are known and identified herein by the term "node of velocity." Note that the nodes of stress 28 and 30 are respectively within the pickup coil 22 and the driving coil 19. The node of velocity 29 is within the permanent magnet 20. This arrangement provides for maximum coupling between the driving and pickup coils and the magnetostrictive element 16.

The permanent magnet 20 acts as a magnetic shield between the two coils 19 and 22, so that the coupling between the coils is predominantly magnetostrictive, through the tube 16. The dynamic ratio (output/input ratio) is greatly enhanced by this shielding. A similar shielding effect could be attained by any undirectional magnetic field between the coils 19 and 22, whether produced by an electromagnet or by a permanent magnet.

An elongated magnetostrictive element which is freely supported so that its motion is not restricted at any point throughout its length is mechanically resonant at a natural frequency such that the length of the element is equal to a whole number multiple of half wave lengths of compression waves (i.e., sonic or ultrasonic waves) in the material of which the element is constructed. The tube 16, however, is not freely supported, but is attached at one end to the diaphragm 15. Consequently, the left hand end of the tube 16 is not free to move but must move the diaphragm 15 in order to move itself. The diaphragm at the left hand end of tube 16 is therefore loaded or damped. When a standing wave is set up in the tube 16, the effect of this load is to delay the reflection of waves from that end of the tube. Consequently, if it is desired to have the vibrating unit including the magnetostrictive element 16 and its supporting structure resonant at a particular frequency, then the tube 16 must be shortened somewhat from the length of a freely supported tube which would be resonant at that frequency. In FIG. 2, the distance between the free end 16a of the tube 16 and the point 31 represents one full wave length at the particular frequency at which the transducer is to be operated. The tube 16 is made shorter than that wave length by the distance $d$.

The determination of the spacing $d$ requires an approximation of the effective mass represented by the diaphragm and the housing 12. The spacing $d$ is not highly critical. Substantial advantages in operation of the transducer can be secured by using close approximations of the distance $d$. For a particular transducer having a wave length corresponding to a frequency of 80 kilocycles it was found that the optimum distance $d$ was approximately equal to 0.136 times the wave length.

*FIGS. 3 and 4*

In order to secure the optimum operation of the transducer without having variations in its output due to variations in temperature, the magnetic force of the biasing magnet 20 and the magnetic force of the applied signal as produced by the coil 19 should be selected according to the principles indicated in FIGS. 3 and 4.

FIG. 3 shows the variation of permeability ($\mu$) with magnetic force (H), of a typical magnetostrictive material. The curve 32 shows the characteristic variation at a temperature of 20° K. and the curve 33 shows the characteristic variation at a temperature of 400° K. Note that these two curves intersect at a point 34 corresponding to a particular value of magnetic force indicated at $H_0$. Note also that the curve 32 has a peak at a magnetic force of $H_2$ and the curve 33 has a peak at a magnetic force of $H_1$.

It should be recognized that the curves shown in FIGS. 3 and 4 are idealized and that curves encountered in actual practice will differ somewhat. For example, the intersection 34 appears in these curves at a locality such that $H_0$ lies halfway between $H_1$ and $H_2$. In practical curves, $H_0$ is not usually found exactly halfway between $H_1$ and $H_2$, but nevertheless is not usually far from the halfway point. Neverthelesss, the magnetic force of the biasing magnet 20 or other biasing device should be selected so that its magnetic force is substantially at the value $H_0$ which corresponds to the intersection of the two curves 32 and 33 which represent the variation of permeability with magnetic force at the two ends of the temperature range over which it is desired to operate the transducer. The signal strength, i.e., the varying magnetic force applied by the coil 19 was chosen so that its value $\Delta H$ produces a resultant field which varies substantially between the two peaks of the curves 32 and 33. If the biasing magnetic force $H_0$ and the signal magnetic force $\Delta H$ are so chosen, then the resulting changes in flux density $\Delta B$ will occur as illustrated in FIG. 4.

In FIG. 4, there is shown a curve 35 representing the variation of flux density B with magnetic force H at a temperature at 20° K. and a curve 36 illustrating the variation of B with H at a temperature of 400° K. Note that if the biasing force $H_0$ is used and the signal force is such as to vary the resultant field between $H_1$ and $H_2$. then the resulting amplitude of variation of flux density of 400° K. is that illustrated at $\Delta B_1$. At 20° K., the amplitude of variation of flux density is represented by $\Delta B_2$. These amplitudes are approximately equal. Consequently, it should be understood that the output signal induced in the coil 22 by that amplitude of variation of flux density will be the same at both of the two temperatures.

The signal force does not have to be great enough to shift the value of H between $H_1$ and $H_2$. The signal force may have an amplitude substantially less than $H_2-H_1$, and still the variation in $\Delta B$ with temperature will not be appreciable, as long as the net magnetizing force stays within the region approximately limited by $H_1$ and $H_2$, where both B–H curves are linear, or substantially linear.

FIG. 5 illustrates the variation of the output of coil 22 with temperature and with the diaphragm undamped, i.e., no liquid is impinging on the diaphragm 15. Note that the output voltage at 20° K. is substantially equal to the output voltage at 400° K. While the output voltage at intermediate values of temperature increases slightly above the values at the two extremes, the overall variation is very small.

The housing 12 and the diaphragm 15 should be made of austenitic stainless steel or any other materials that exhibit low acoustical energy absorbing characteristics, such as most aluminum alloys.

The magnetostrictive element or tube 16 should preferably be made of isothermoelastic material in order to give the best results. By isothermoelastic material is meant a material whose modulus of elasticity does not vary substantially with temperature. It is preferred to use a well known alloy known as Ni-Span C manufactured by International Nickel Company and containing from 41–43% nickel, 2.2–2.6% titanium, 5.1–5.7% chromium to a maximum of 0.06% carbon, 0.30–0.60% manganese, 0.30–0.38% silicon, 0.40–0.48% aluminum, a maximum of 0.04% phosphorus and a maximum of 0.01% silver.

While we have shown and described a preferred embodiment of our invention, other modifications thereof will readily occur to those skilled in the art, and we therefore intend our invention to be limited only by the appended claims.

What is claimed:
1. A magnetostrictive transducer operable over a predetermined temperature range, comprising:
   (a) a magnetostrictive means resonant at a predetermined frequency, said means including an element of magnetostrictive material having two different characteristic curves of variation of permeability ($\mu$) with magnetizing force (H) at the two temperatures at the ends of said range, said curves intersecting at a first particular value ($H_0$) of magnetizing force and having respective maxima of permeability at second and third particular values ($H_1$ and $H_2$) of magnetizing force respectively smaller and larger than said first particular value;
   (b) biasing means for subjecting said magnetostrictive element to a unidirectional magnetic field having a magnetizing force substantially equal to said first particular value; and
   (c) driving means for superimposing on said unidirectional field a second magnetic field varying cyclically at said predetermined frequency between magnetizing force values predetermined so that the two fields cooperate to establish a resultant field acting on said element and varying cyclically at said predetermined frequency within a range of magnetizing force values limited substantially by said second and third values of magnetizing force.

2. A magnetostrictive transducer as defined in claim 1, in which:
   (a) said magnetostrictive means is elongated and has a length effectively equal to one full wave length at said frequency;
   (b) said driving means is located adjacent a node of stress in said magnetostrictive means; and
   (c) said biasing means is located adjacent a node of velocity in said magnetostrictive means.

3. A magnetostrictive transducer, comprising:
   (a) an elongated magnetostrictive element;
   (b) a hollow cylindrical housing enclosing at least a portion of the element and spaced therefrom;
   (c) a diaphragm having its center attached to one end of the element and having its periphery attached to the housing, said element being supported solely by said diaphragm with its enclosed portion extending axially of the housing;
   (d) mounting means at one end of the housing adapted for attachment to a fixed support;
   (e) a convoluted portion of the housing between the diaphragm and the mounting means and effective to prevent transmission of vibration from the diaphragm to the mounting means;
   (f) driving means for subjecting said element to a cyclically varying magnetic field; and
   (g) sensing means responsive to longitudinal vibrations of the element.

4. A magnetostrictive transducer operable over a predetermined temperature range, comprising:
   (a) magnetostrictive means resonant at a predetermined frequency and including:
      (1) an elongated element of magnetostrictive material having two different characteristic curves of variation of permeability ($\mu$) with magnetizing force (H) at the two temperatures at the ends of said range, said curves intersecting at a first particular value ($H_0$) of magnetizing force and having respective maxima of permeability at second and third particular values ($H_1$ and $H_2$) of magnetizing force, respectively smaller and larger than said first particular value;
      (2) a hollow cylindrical housing enclosing at least a portion of the element and spaced therefrom;
      (3) a circular diaphragm having its center attached to one end of the element and having its periphery attached to the housing, said element being supported solely by said diaphragm with its enclosed portion extending axially of the housing;

(4) said element, said housing and said diaphragm constituting a structure resonant at a predetermined frequency;
(5) said element being somewhat shorter than one full wavelength of said frequency to compensate for the stiffness introduced by the housing and the diaphragm;
(b) biasing means for subjecting said element to a unidirectional magnetic field having a magnetizing force substantially equal to said first particular value, said biasing means including a permanent magnet of cylindrical form encircling said element and magnetized longitudinally;
(c) driving means for superimposing on said unidirectional field a second magnetic field varying cyclically at said predetermined frequency between magnetizing force values predetermined so that the two fields cooperate to establish a resultant field acting on the element and varying cyclically at the predetermined frequency within a range of magnetizing force values limited substantially by said second and third values of magnetizing force, said driving means comprising a first coil encircling said element and within said housing;
(d) sensing means responsive to longitudinal vibrations of the element and comprising a second coil encircling said element and within said housing;
(e) said first and second coils encircling nodes of stress in said element and being spaced longitudinally from nodes of velocity of said element;
(f) said permanent magnet being located longitudinally of the housing between said first and second coils and encircling a node of velocity thereof.

5. A magnetostrictive transducer comprising:
(a) a hollow cylindrical housing having one end adapted for attachment of a support and closed at its opposite end, said housing having an internal shoulder adjacent to but spaced from said one end;
(b) a hollow cylindrical magnetostrictive element of substantially smaller diameter than the housing attached to the center of the closed end of the housing and projecting therefrom within the housing to a free end spaced inwardly of the housing from said shoulder;
(c) a sleeve of electrically insulating material having an external flange at one end and having its flanged end inserted into said housing between the housing and the cylindrical element, with the periphery of the flange engaging the interior of the housing adjacent but spaced from the closed end thereof;
(d) a first electrical winding encircling said sleeve adjacent the flanged end thereof;
(e) a hollow cylindrical permanent magnet, magnetized longitudinally and encircling said sleeve adjacent said first winding;
(f) a second winding encircling said sleeve adjacent the end of said permanent magnet remote from said first winding;
(g) a collar having an external shoulder abutting said internal shoulder on the cylindrical housing and extending inwardly of the housing with its inner end encircling the outer end of said sleeve; and
(h) means connecting the inner end of said collar to said sleeve.

6. A magnetostrictive transducer, comprising:
(a) an elongated magnetostrictive element;
(b) a hollow cylindrical housing enclosing at least a portion of said element;
(c) a diaphragm having its center attached to one end of the element and having its periphery attached to one end of said housing, said element being supported solely by said diaphragm with its enclosed portion centrally of the housing;
(d) mounting means at the other end of the housing adapted for attachment to a fixed support;
(e) said element, said housing and said diaphragm constituting a structure resonant at a predetermined frequency;
(f) driving means for subjecting said element to a cyclically varying magnetic field comprising a first coil encircling said element and within said housing;
(g) sensing means responsive to longitudinal vibrations of said element comprising a second coil encircling said element and within said housing;
(h) said first and second coils encircle nodes of stress in said element and are spaced longitudinally of said element from nodes of velocity therein;
(i) biasing means including a permanent magnet of hollow cylindrical form encircling said element between said first and second coils, said magnet being magnetized longitudinally to provide magnetic biasing flux for said element.

7. A magnetostrictive transducer, comprising:
(a) an elongated magnetostrictive element;
(b) a hollow cylindrical housing enclosing at least a portion of the element and spaced therefrom;
(c) a diaphragm having its center attached to one end of the element and having its periphery attached to the housing, said element being supported solely by said diaphragm with its enclosed portion extending axially of the housing;
(d) mounting means at one end of the housing adapted for attachment to a fixed support;
(e) said element, said housing and said diaphragm constituting a structure resonant at a predetermined frequency;
(f) said element being somewhat shorter than one full wavelength of said frequency to compensate for the stiffness introduced by the housing and the diaphragm;
(g) driving means including a first coil encircling said element and within said housing for subjecting said element to a magnetic field cyclically varying at said frequency; and
(h) sensing means including a second coil encircling said element and within said housing and responsive to longitudinal vibrations of said element;
(i) said first and second coils encircling nodes of stress in said element and being spaced longitudinally of said element from nodes of velocity therein.

References Cited by the Examiner
UNITED STATES PATENTS

| Re. 19,461 | 2/1935 | Pierce | 331—157 |
| 2,407,256 | 9/1946 | Dallin | 340—11 |
| 2,753,529 | 7/1956 | Maron et al. | 310—26 |
| 2,962,695 | 11/1960 | Harris | 340—10 |
| 3,070,790 | 12/1962 | Roth | 340—11 |
| 3,100,390 | 8/1963 | Banks | 73—290 X |
| 3,101,422 | 8/1963 | Church et al. | 310—26 |
| 3,139,544 | 6/1964 | Tomes | 310—26 |
| 3,151,284 | 9/1964 | Kleesattel | 331—157 |

RICHARD C. QUEISSER, *Primary Examiner.*

DAVID SCHONBERG, *Examiner.*

L. R. FRANKLIN, *Assistant Examiner.*